United States Patent
Yamaguchi et al.

(10) Patent No.: US 7,444,446 B2
(45) Date of Patent: Oct. 28, 2008

(54) OPTICAL DVI CABLE, OPTICAL SIGNAL TRANSMISSION EQUIPMENT AND OPTICAL SIGNAL TRANSMISSION SYSTEM WHICH HAVE THE CABLE, AND METHOD OF TRANSMITTING OPTICAL SIGNAL USING THE CABLE

(75) Inventors: Hideki Yamaguchi, Osaka (JP); Hideya Konda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/411,225

(22) Filed: Apr. 26, 2006

(65) Prior Publication Data
US 2006/0246772 A1 Nov. 2, 2006

(30) Foreign Application Priority Data
Apr. 28, 2005 (JP) .............................. 2005-133575

(51) Int. Cl.
G06F 13/42 (2006.01)
G06F 13/00 (2006.01)
G06F 13/38 (2006.01)
G01V 3/00 (2006.01)
H03M 1/00 (2006.01)
H04B 10/00 (2006.01)

(52) U.S. Cl. .................. 710/106; 710/72; 710/100; 340/854.7; 341/137; 398/140

(58) Field of Classification Search .................. 710/72, 710/100, 106; 340/854.7; 341/137; 398/140
See application file for complete search history.

(56) References Cited

U.S. PATENT DOCUMENTS

2004/0158662 A1* 8/2004 Konda et al. .................. 710/72
2006/0031611 A1 2/2006 Konda
2006/0083518 A1* 4/2006 Lee et al. .................. 398/155
2006/0187983 A1* 8/2006 Baba et al. ............... 372/38.07

FOREIGN PATENT DOCUMENTS

| JP | S62-077788 A | 4/1987 |
| JP | 2002-366340 A | 12/2002 |
| JP | 2006-058549 A | 3/2006 |

OTHER PUBLICATIONS

Universal Serial Bus System Architecture; Don Anderson; Copyright 1997; pp. 53-57.*
Optical DVI module (catalog), Jul. 2003, 4 pages, MB-11030-1DV1, Nihon Kouku Electric Industries Co, Tokyo, Japan.

* cited by examiner

*Primary Examiner*—Mark Rinehart
*Assistant Examiner*—Jeremy S Cerullo
(74) *Attorney, Agent, or Firm*—Global IP Counselors, LLP (57) ABSTRACT

The present invention provides an optical DVI cable and optical signal transmission equipment which can prevent the leakage of laser light to the outside. The optical DVI cable includes (1) a transmission side unit having a laser light emitting element unit, and configured and arranged to convert input electrical signals into optical signals and to transmits the optical signals, (2) a reception side interface unit configured and arranged to receive the optical signals transmitted from the transmission side interface unit, and (3) a connecting cable having metal wires to supply power to the laser light emitting element unit, and optical fibers to transmit optical signals. The transmission side unit may include a power supply terminal. In this case, the metal wires supply power to the laser light emitting element unit from the transmission side unit via the reception side unit.

10 Claims, 6 Drawing Sheets

OPTICAL DVI CABLE, OPTICAL SIGNAL TRANSMISSION EQUIPMENT AND OPTICAL SIGNAL TRANSMISSION SYSTEM WHICH HAVE THE CABLE, AND METHOD OF TRANSMITTING OPTICAL SIGNAL USING THE CABLE

BACKGROUND OF THE INVENTION

1. Field of the Invention

The present invention relates to an optical DVI cable, an optical signal transmission equipment and an optical signal transmission system which have the cable, and a method of transmitting optical signal using the cable.

2. Related Background Art

Figure 6:
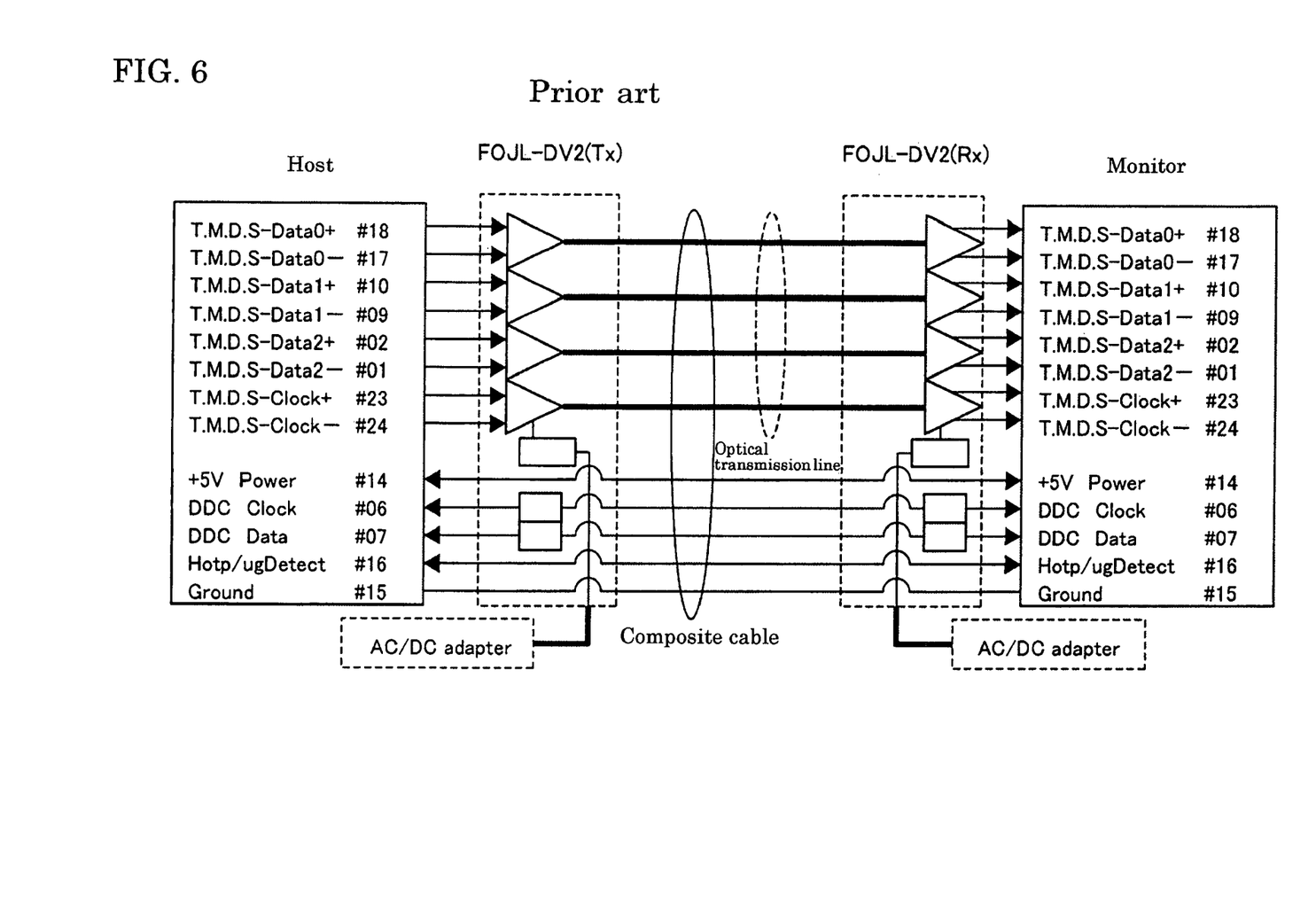
FIG. 6 is a block diagram which shows a conventional optical DVI cable along with the devices on the host side and monitor side.

One example of an optical DVI cable based on the Digital Visual Interface (DVI) standard is disclosed in Japan Aviation Electronics Industry, Ltd., Catalog 2003.7 MB-11030-1DVI.pdf. FIG. 6 is a block diagram showing a conventional optical DVI cable together with the host side and monitor side devices. This optical DVI cable includes a transmission module FOJL-DV2(Tx), a reception module FOJL-DV2(Rx), and an electrooptical composite cable (hereafter referred to as a composite cable).

An electrical-optical conversion means (mainly laser diodes) for converting digital video signals input from the host side into optical signals is built into the transmission module. An optical-electrical conversion means (mainly photodiodes) for converting optical signals that have been transmitted from the transmission module into electrical signals is built into the reception module. Power is supplied to the transmission module and reception module by respective dedicated AC/DC adapters that convert a commercial power supply into a direct-current voltage.

The composite cable contains a plurality of optical fibers and a plurality of metal wires. The respective optical fibers transmit the laser signals emitted from the respective laser diodes of the transmission module to the respective photodiodes of the reception module. The metal wires include power supply wires, ground wires, display data channel (DDC) signal wires, and hot plug detect (HPD) wires. The DDC signal wires are used to transmit information from the monitor side to the host side. Furthermore, the DDC signals transmitted by the DDC signal wires include DDC data and a DDC clock. The HPD signals are signals that check the connection state.

In a conventional optical DVI cable, power is supplied by respective dedicated AC/DC adapters for the transmission module and reception module. Accordingly, for example, in cases in which the composite cable has a detachable connector at an intermediate point, a problem arises whereby laser light leaks to the outside during detachment of the connector or in the case of errors in the mounting procedure. Alternatively, there may also be cases in which laser light leaks to the outside as a result of the composite cable being cut in an accident or the like. Lasers used for data transfer do not pose the same danger to humans as lasers that are used for machining. However, since such lasers have high brightness, it is not desirable for the laser light to enter the eyes directly.

Furthermore, the transmission module and reception module used in an optical DVI cable are standardized, and are relatively large in size (width: 39.4 mm, thickness: 15.1 mm, depth of main body part: 57 mm). It is difficult to pass a cable which has such a transmission module and reception module at both ends through ordinary tubing.

SUMMARY OF THE INVENTION

It is an object of the present invention to provide an optical DVI cable which can prevent the leakage of laser light to the outside, to provide an optical signal transmission equipment and an optical signal transmission system which have the cable, and to provide a method of transmitting optical signal using the cable.

In order to achieve this object, a DVI cable is provided which includes (1) a transmission side interface unit having a laser light emitting element unit, and configured and arranged to convert input electrical signals into optical signals and to transmit the optical signals, (2) a reception side interface unit configured and arranged to receive the optical signals transmitted from the transmission side interface unit, and (3) a composite cable having one or more metal wires to supply power to the laser light emitting element unit and optical fibers to transmit optical signals, the composite cable connecting the transmission side interface unit and the reception side interface unit.

The reception side interface unit may include a power supply terminal. In this case, the one or more metal wires includes a single metal wire for supplying power to the laser light emitting element unit from the reception side interface unit. Alternatively, the transmission side interface unit may include a power supply terminal. In this case, the one or more metal wires includes an outbound-path metal wire and a return-path metal wire for supplying power to the laser light emitting element unit from the transmission side interface unit via the reception side interface unit.

In addition, an optical signal transmission equipment is provided which includes the optical DVI cable of the present invention, and power supply section for supplying power to the laser light emitting element unit via one or more metal wires. Furthermore, an optical signal transmission system is provided which includes the optical DVI cable of the present invention, power supply section for supplying power to the laser light emitting element unit via one or more metal wires, a host device, and a receiver.

In another aspect of the present invention, there is provided a method of transmitting optical signal in which providing the optical DVI cable of the present invention, converting input electrical signals into optical signals by electrical power supplied via one or more metal wires in a laser light emitting element unit, and transmitting these optical signals from the transmission side unit to the reception side unit via optical fibers.

DETAILED DESCRIPTION OF THE INVENTION

Below, preferred aspects for working the present invention will be described in detail with reference to the attached figures. The attached figures are used to describe embodiments, and do not limit the scope of the invention. The relationships of the magnitudes indicated in the attached figures do not always coincide with the actual relationships. Furthermore, in the figures, the same elements are labeled with the same symbols, and a redundant description is omitted.

Figure 1:
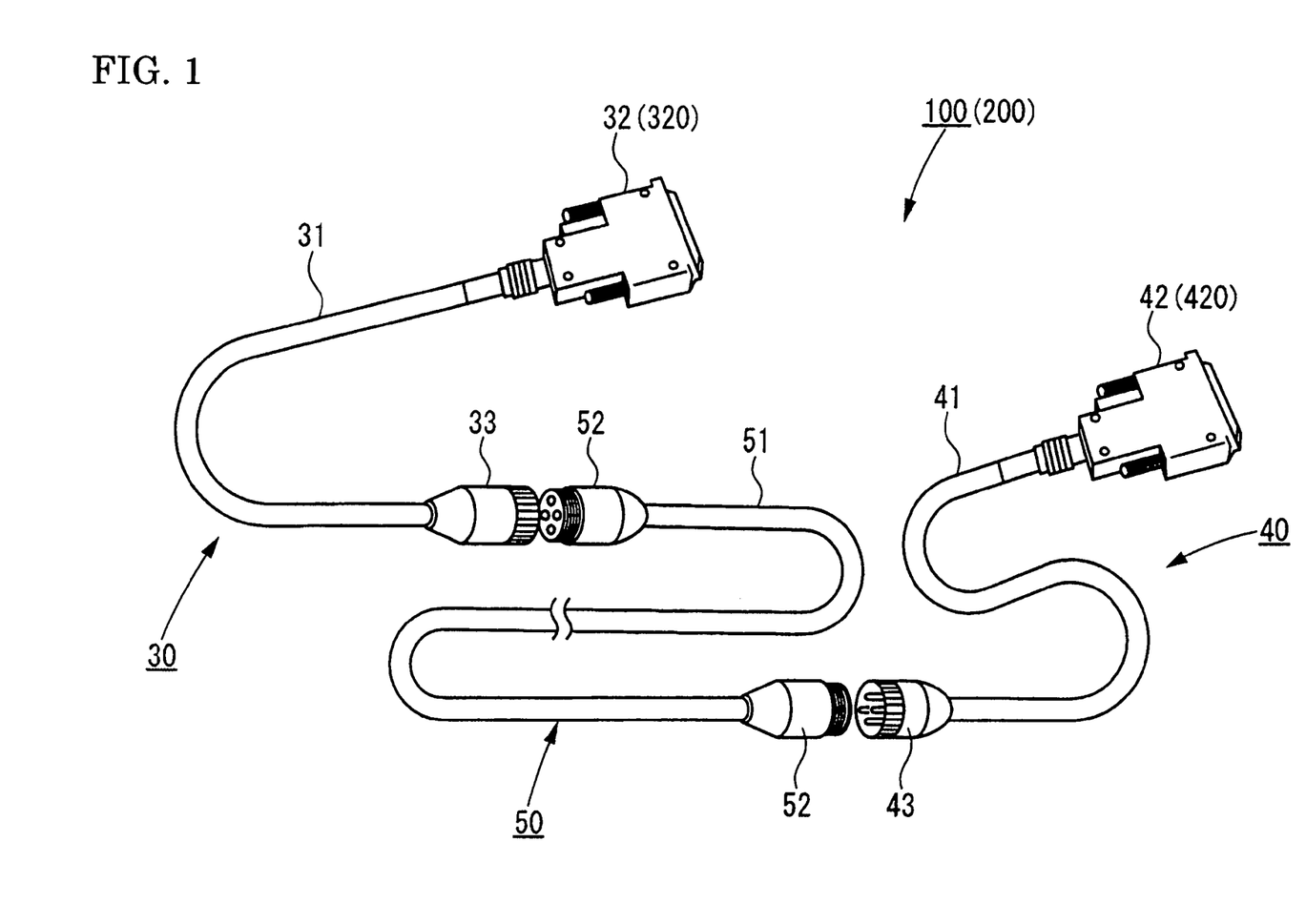
FIG. 1 is a perspective view of an optical DVI cable according to a first embodiment of the present invention.

FIG. 1 is a perspective view of an optical DVI cable according to a first embodiment of the present invention. The optical DVI cable 100 of the first embodiment includes a transmission side interface unit 30, a reception side interface unit 40, and an optical cable unit 50. The transmission side interface unit 30 corresponds to the transmission module in a conventional DVI cable, and the reception side interface unit 40 corresponds to the reception module in a conventional DVI cable.

The transmission side interface unit 30 includes a composite cable 31 which has a length of approximately 0.1 m to 0.4 m, a transmission side connector 32 which conforms to DVI standards and is attached to one end of the composite cable 31, and a male type connector 33 which is smaller than the transmission side connector 32 and is attached to the other end of the composite cable 31. The reception side interface unit 40 includes a composite cable 41 which has a length of approximately 0.1 m to 0.4 m, a reception side connector 42 which is attached to one end of the composite cable 41, and a male type connector 43 which is smaller than the reception side connector 42 and is attached to the other end of the composite cable 41.

The optical cable unit 50 includes a composite cable 51 of arbitrary length, and compact female type connectors 52 mounted on each of the two ends of the composite cable 51. This optical cable unit 50 constitutes a junction line between the transmission side interface unit 30 and the reception side interface unit 40. The male type connector 33 and one of the female type connectors 52, as well as the male type connector 43 and the other female type connector 52, form separable connecting parts in the optical DVI cable 100.

Figure 2:
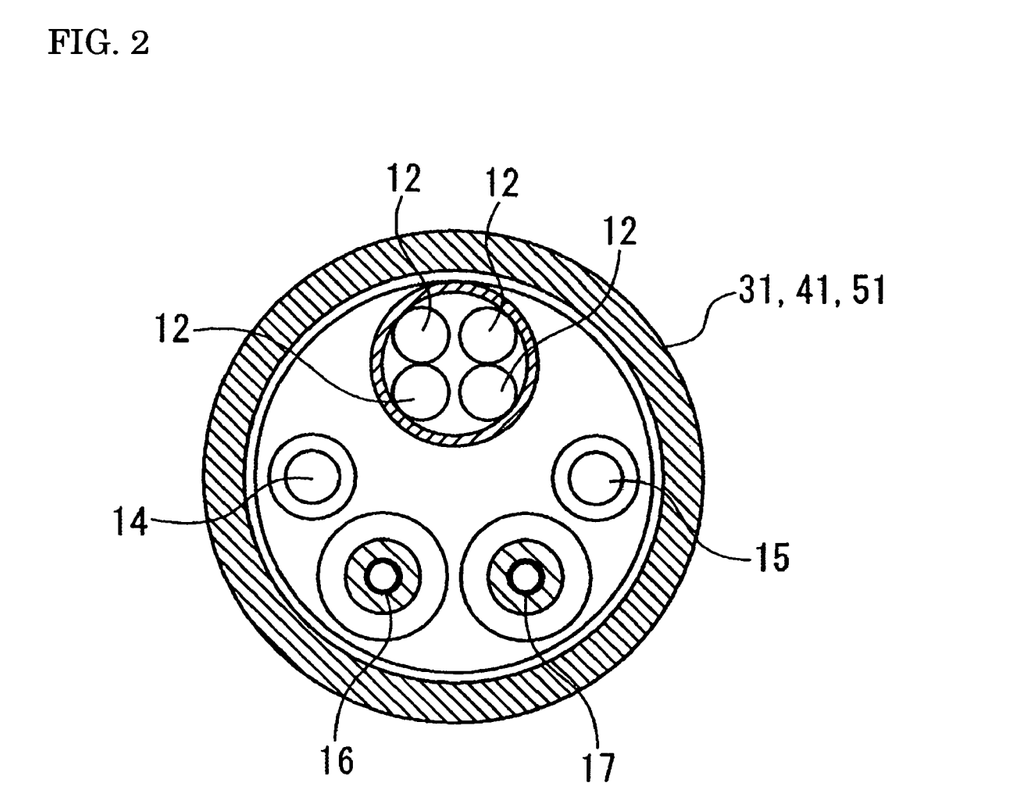
FIG. 2 is a longitudinal cross sectional view of the composite cable in the optical DVI cable of the first embodiment.

FIG. 2 is a longitudinal cross sectional view of the composite cables 31, 41 and 51 in the optical DVI cable 100 of the first embodiment. The composite cables 31, 41 and 51 are cables in which four optical fibers 12 that transmit digital video signals, and four metal wires 14 through 17, are accommodated together. The metal wires 14 through 17 are a power supply wire 14, a ground wire 15, and DDC signal wires 16 and 17. Because the DDC signal wires may potentially be used at a maximum of 100 kHz, they are desirable to be shielded wires in order to suppress signal attenuation. However, the wires need not be shielded if the cable is short.

Figure 3:
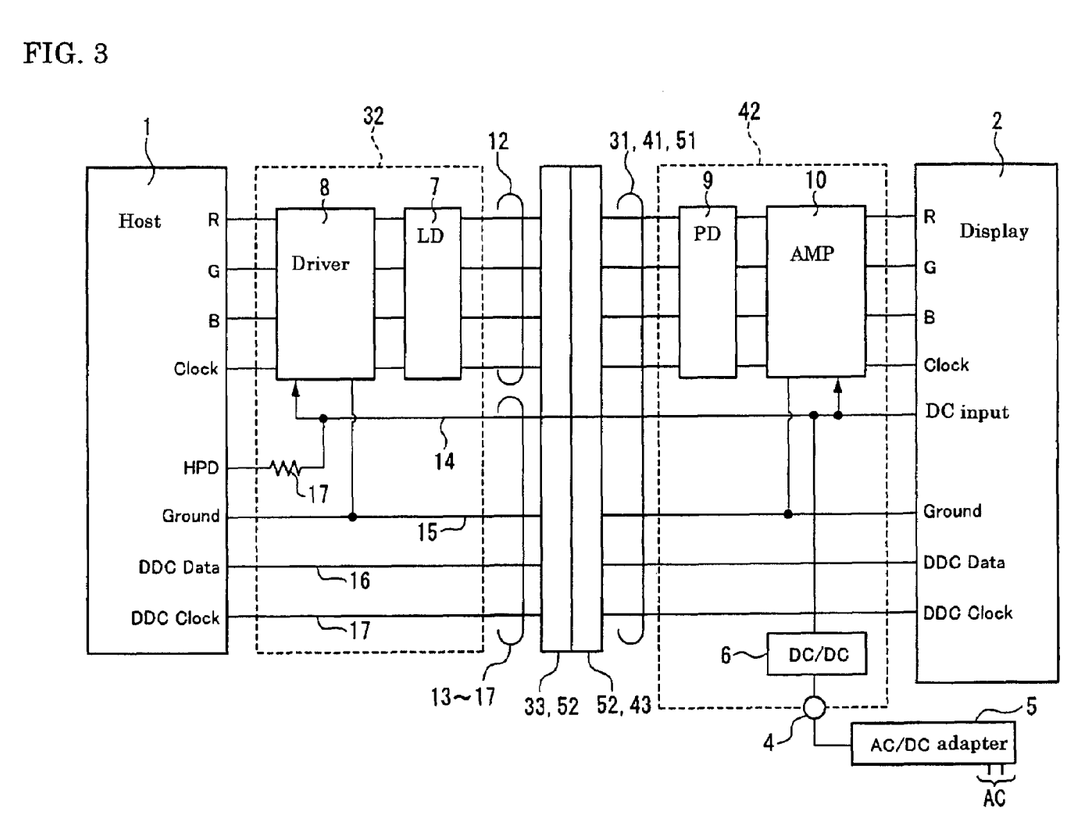
FIG. 3 is a block diagram showing an optical signal transmission system which has the optical DVI cable of the first embodiment.

FIG. 3 is a block diagram showing a signal transmission system which has the optical DVI cable 100 of the first embodiment. The transmission side connector 32 is connected to a host device such as a computer or other device for outputting digital video signals. The reception side connector 42 is connected to a receiver 2 (which may be any of various types of video output display devices, such as a liquid crystal display, plasma display, projector or other device for displaying images of digital video signals). The transmission side connector 32 and reception side connector 42 are connectors that conform to DVI standards and comprise a +5V power supply terminal, a DDC clock terminal for transmitting information relating to the video output display device 2 on the reception side to the host device 1 on the transmission side, a DDC data terminal, and an HPD terminal in addition to terminals used for the transmission of digital video signals (R, G, B, clock).

The transmission side connector 32 comprises a laser light emitting element unit 7 having a built-in laser diode which is used to convert digital video signals from the host device 1 into optical signals from electrical signals and to transmit these optical signals, a driving circuit device 8 for driving the laser light emitting element unit 7, and a resistance element 17 which is used to provide the host device 1 with an HPD signal. The reception side connector 42 comprises a light receiving element unit 9 having a built-in photodiode which is used to restore the digital video signals received as optical signals to electrical signals, an amplifier circuit device 10 for amplifying the output signals of the light receiving element unit 9, a DC/DC converter 6 for converting the direct-current power supply of power supply means (AC/DC adapter) disposed on the reception side into voltages required for the operation of the transmission side connector 32 and reception side connector 42, and a power supply terminal 4 for inputting the direct-current power supply of the AC/DC adapter 5 to the DC/DC converter 6.

One end of the power supply wire 14 is connected to the +5V power supply terminal of the reception side connector 42, and is also connected to the output end of the DC/DC converter 6 contained in the reception side connector 42. The other end of the power supply wire 14 is connected to the power supply input terminal of the driving circuit device 8 inside the transmission side connector 32, and is also connected to HPD terminal of the transmission side connector 32 via the resistance element 17. One end of the ground wire 15 is connected to the ground terminal of the reception side connector 42, and the other end of the ground wire 15 is connected to the ground terminal of the transmission side connector 32. One end of the DDC signal metal wire 16 is connected to the DDC data terminal of the reception side connector 42, and the other end is connected to the DDC data terminal of the transmission side connector 32. One end of the DDC signal metal wire 17 is connected to the DDC clock terminal of the reception side connector 42, and the other end is connected to the DDC clock terminal of the transmission side connector 32.

As a result of the transmission side connector 32 being connected to the host device 1, the R, G, B and clock terminals of the transmission side connector 32 are connected to the respective R, G, B and clock terminals of the host device 1. Furthermore, the HPD terminal, ground terminal, DDC data terminal and DDC clock terminal of the transmission side connector 32 are respectively connected to the HPD terminal, ground terminal, DDC data terminal and DDC clock terminal of the host device 1. As a result of the reception side connector 42 being connected to the video output display device 2, the R, G, B and clock terminals of the reception side connector 42 are connected to the respective R, G, B and clock terminals of the video output display device 2, and the +5V power supply terminal, ground terminal, DDC data terminal and DDC clock terminal of the reception side connector 42 are respectively connected to the DC input terminal, ground terminal, DDC data terminal and DDC clock terminal of the video output display device 2.

The HPD signals are input into the host device 1 from the power supply wire 14 via the resistance element 17. Moreover, an electronically erasable and programmable read only memory (EEPROM), which is a type of nonvolatile memory in which (for example) information relating to the image resolution and information relating to the refresh rate or the like are written, is mounted in the video output display device 2, and power supplied via the power supply wire 14 is used for the driving of this memory. Furthermore, the optical DVI cable 100 and power supply means (AC/DC adapter) 5 constitute an optical signal transmission equipment. This optical signal transmission equipment, the host device 1 and the receiver (video output display device) 2 constitute an optical signal transmission system.

In the optical DVI cable 100 of the first embodiment, power is supplied to the laser light emitting element unit 7 and the driving circuit device 8 inside the transmission side connector 32 via the power supply wires 14 inside the composite cables 31, 41 and 51 from the side of the reception side interface unit 40. Power is not supplied to the laser light emitting element unit 7 or driving circuit device 8 in cases where the connection of the transmission side interface unit 30 and the optical cable unit 50, or the connection of the reception side interface unit 40 and the optical cable unit 50, is not accomplished in a normal manner. Furthermore, power is likewise not supplied to the laser light emitting element unit 7 or driving circuit device 8 in the case of accidents that cut the composite cables 31, 41 and 51.

As a result, even if there is an error in the procedure during the removal or mounting of the respective units 30, 40 or 50, or if an accident occurs that cuts the composite cables 31, 41 or 51, there is no direct output of laser light from the transmission side interface unit or leakage to the outside from the cut portions of the, composite cables, and safety can be ensured.

In the first embodiment, the optical DVI cable has separable connecting parts that can be connected and separated by means of connectors, and includes three parts, i.e., a transmission side interface unit 30, a reception side interface unit 40, and an optical cable unit 50. Since the connectors 52 which are smaller than connectors conforming to DVI standards are attached to the optical cable unit 50, installation of the composite cables can be accomplished very simply by means of an optical cable unit 50 in which the optical fibers are installed in a slender tube.

Figure 4:
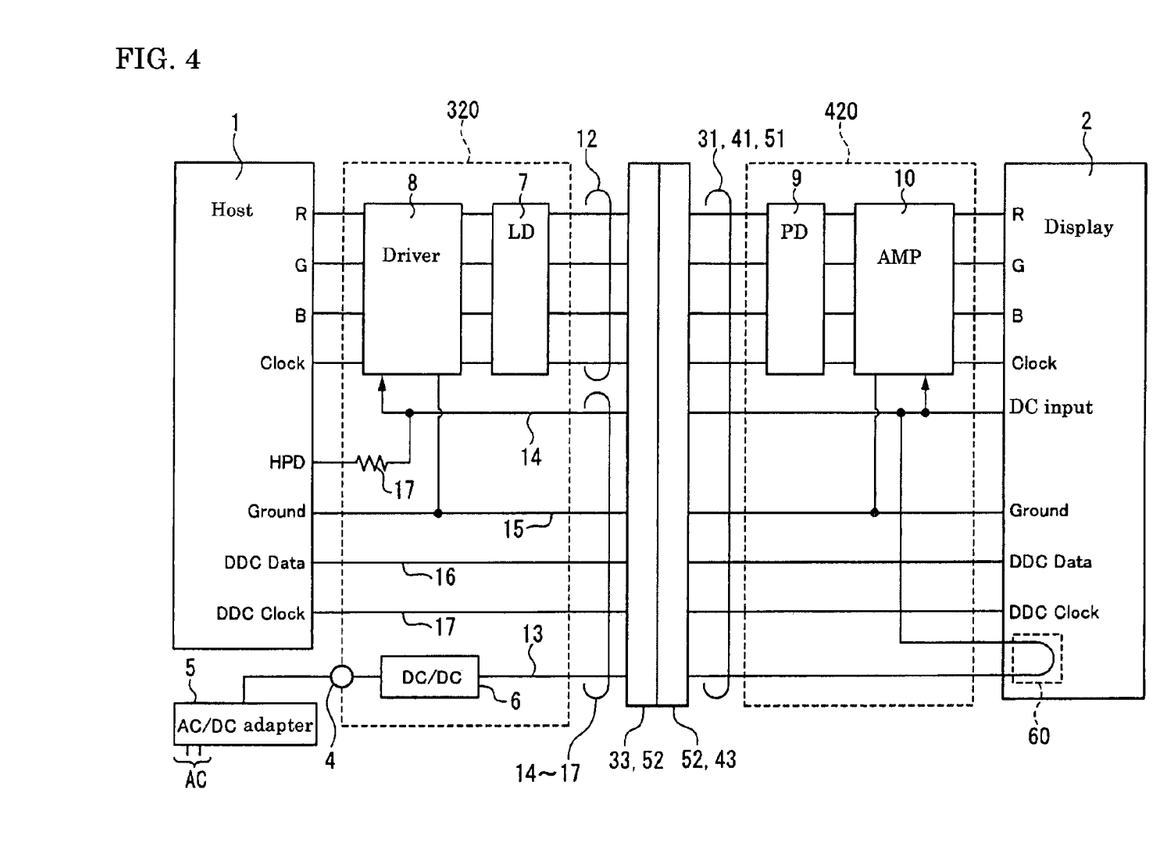
FIG. 4 is a block diagram showing an optical signal transmission system which has an optical DVI cable according to a second embodiment of the present invention.

FIG. 4 is a block diagram showing an optical signal transmission system which has a DVI cable according to a second embodiment of the present invention. The optical DVI cable of the second embodiment is similar to the optical DVI cable of the first embodiment except for the power supply method used. Furthermore, since the external appearance of the optical DVI cable of the second embodiment is similar to that of the optical DVI cable of the first embodiment, the optical DVI cable of the second embodiment will be described with reference to FIG. 1.

In the optical DVI cable of the second embodiment, the transmission side connector 320 has the following components in addition to the laser light emitting element unit 7 and driving circuit device 8: a DC/DC converter 6 for converting the direct-current power supply of power supply means (AC/DC adapter) 5 disposed on the transmission side into voltages required for the operation of the transmission side connector 32 and reception side connector 42, and a power supply terminal 4 for inputting the direct-current power supply of the AC/DC adapter 5 into the DC/DC converter 6. The reception side connector 420 comprises a light receiving element unit 9 and an amplifier circuit device 10.

Figure 5:
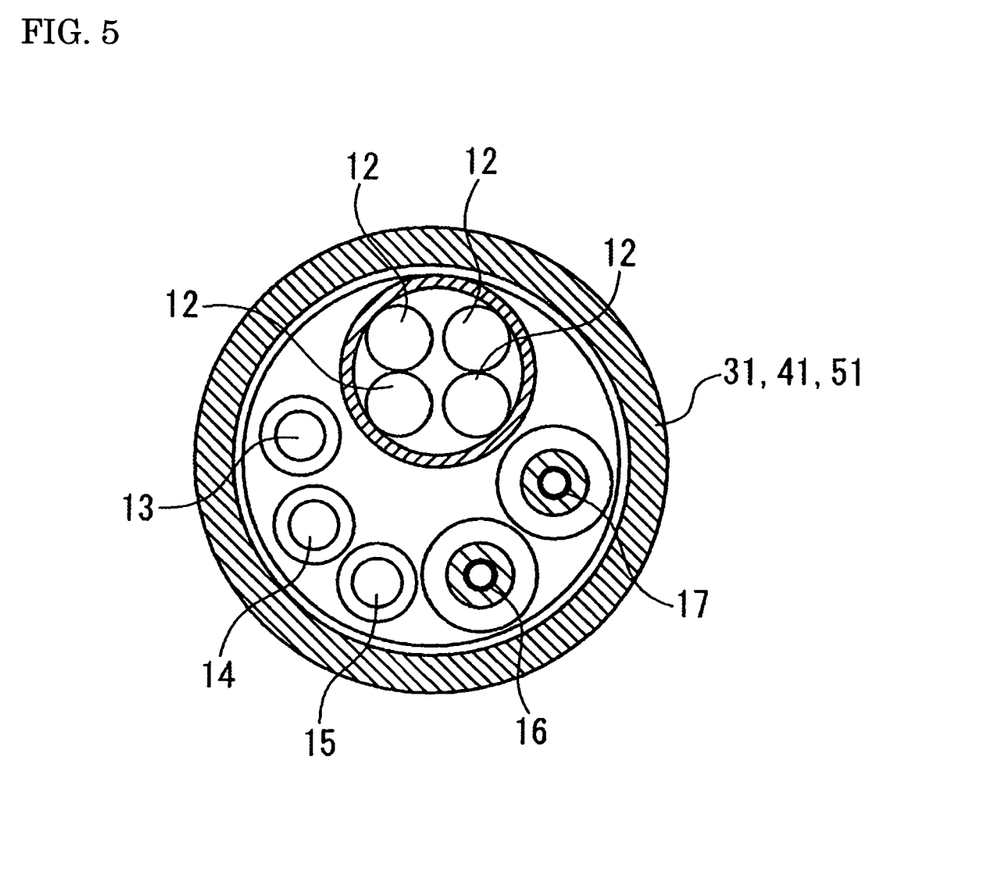
FIG. 5 is a longitudinal sectional view of the composite cable in the optical DVI cable of the second embodiment.

FIG. 5 is a longitudinal cross sectional view of the composite cable in the optical DVI cable of the second embodiment. Each of the composite cables 31, 41 and 51 has the following wires constructed as an integrated structure: four optical fibers 12 that transmit digital video signals; three metal wires, i.e., first and second power supply wires 13 and 14, and a ground wire 15; and metal wires 16 and 17 used for DDC signals.

One end of the first power supply wire 13 is connected to the output end of the DC/DC converter 6 contained in the transmission side connector 320, and the other end is connected to the open terminal of the reception side connector 420. This open terminal connects the reception side connector 420 tow the receiver (video output display device) 2, so that this connector is connected to the turn-back circuit 60 in the video output display device 2.

One end of the second power supply wire 14 is connected to the DC input terminal of the driving circuit device 8 of the transmission side connector 320, and is connected to the HPD terminal of the transmission side connector 320 via the resistance element 17. The other end is connected to the DC input terminal of the amplifier circuit device 10 of the reception side connector 420, and is connected to the +5V power supply terminal of the reception side connector 420. Furthermore, since the reception side connector 420 is connected to the video output display device 2, the second power supply wire 14 is connected to the first power supply wire 13 by the turn-back circuit 60.

One end of the ground wire 15 is connected to the ground terminal of the transmission side connector 320, and is also connected to the ground terminal of the driving circuit device 8 inside the transmission side connector 320. The other end is connected to the ground terminal of the reception side connector 420, and is also connected to the ground terminal of the amplifier circuit device 10 inside the reception side connector 420. The power from the transmission side that is fed via the power supply wire 13 is utilized for the driving of the EEPROM mounted in the video output display device 2. Furthermore, the optical DVI cable 200 and power supply means (AC/DC adapter) 5 constitute an optical signal transmission equipment, and the optical signal transmission equipment, the host device 1, and the receiver (video output display device) 2 constitute an optical signal transmission system.

In the second embodiment, the power for operating the respective built-in circuits of the transmission side connector 320 and reception side connector 420 (laser light emitting element unit 7, driving circuit device 8, light receiving element unit 9, and amplifier circuit device 10) is supplied from the transmission side. Furthermore, the power is returned along a path having the following sequence of elements: transmission side connector 320, reception side connector 420, video output display device 2, reception side connector 420, and transmission side connector 320.

As a result, power will not be supplied to the respective built-in circuits of the transmission side connector 320 or reception side connector 420 in the presence of even one irregular connection in the connectors 33 and 52 between the transmission side interface unit 30 and optical cable unit 60; one irregular connection in the connectors 43 and 52 between the reception side interface unit 40 and optical cable unit 50; or one irregular connection between the reception side connector 420 and video output display device 2. Accordingly, there is no leakage of laser light to the outside, and safety can be ensured even if there is an error in the separation or mounting procedure between the transmission side interface unit 30 and optical cable unit 50 or between the reception side interface unit 40 and optical cable unit 50.

Furthermore, no power will be supplied to the respective built-in circuits of the transmission side connector 320 or reception side connector 420 in the absence of a connection even in one of the connectors, e.g., the male connector 33 of the transmission side interface unit 30 and the female connector 52 of the optical cable unit 50, or the male connector 43 of the reception side interface unit 40 and the female connector 52 if the optical cable unit 50. Accordingly, the turn-back circuit 60 inside the video output display device 2 is not absolutely necessary. However, providing such a turn-back circuit 60 makes it possible to determine the presence or absence of cable connections at the video output display device 2. As a result, the user can be informed of the presence or absence of cable connections by a display or the like. The user can confirm the connected state of the cable (presence or absence of connector connections) at a glance merely by checking this display.

Furthermore, in the second embodiment, the optical DVI cable is constituted by three parts, i.e., a transmission side interface unit 30, a reception side interface unit 40, and an optical cable unit 50 that constitutes a junction line between these units 30 and 40. Furthermore, connectors 52 that are smaller than connectors conforming to DVI standards are attached to the optical cable unit 50. Accordingly, the cable can be laid with greater ease by using a small-diameter cable in the optical cable unit 50.

Furthermore, in the first and second embodiments, a case was described in which the lengths of the composite cable 31 of the transmission side interface unit 30 and the composite cable 41 of the reception side interface unit 40 were set at approximately 0.1 m to 0.4 m. However, the lengths are not necessarily limited to these values and may be greater than or less than these values. It is apparent that direct connection is also possible. Furthermore, the transmission side interface unit 30 and the host device 1 were connected via a transmission side connector 32 (320), but a direct connection can also be used instead of a connection via a connector.

Furthermore, in both the first and second embodiments, separable connecting parts were formed in the optical DVI cable 100, but the present invention is not limited to such a construction alone. Even in an optical DVI cable in which separable connecting parts are not formed at intermediate points in the composite cable, the leakage of laser light to the outside can also be prevented by stopping or discontinuing the supply of power in cases where the composite cable is cut due to an unforeseen accident or the like, or various types of receivers are connected and power is supplied from the reception side interface unit, because power to the laser light emitting element unit is supplied via the metal wires of a composite cable.

The entire description disclosed in Japanese Patent Application No. 2005-133575 filed on Apr. 29, 2005 is hereby incorporated by reference.

We claim:

1. An optical DVI cable comprising:
a transmission side interface unit for attachment to a host device, said transmission side interface unit having a laser light emitting element unit and a driving circuit device to drive said laser light emitting unit, said laser light emitting element unit converting input electrical signals from the host device into optical signals and transmitting the optical signals;
a reception side interface unit for attachment to a display device, said reception side interface unit having a light receiving element unit to receive the optical signals transmitted from said transmission side interface unit and an amplifier circuit device to amplify signals received by said light receiving element unit and transmit the amplified signals to the display device;
a power converter unit disposed within one of said transmission side interface unit and said reception side interface unit, said power converter unit supplying DC power to at least one of said driving circuit and said amplifier circuit device; and
a composite cable operably connected to transmit the optical signals from said transmission side interface unit to said reception side interface unit having one or more metal wires to supply power from said power converter unit via said reception side interface unit to said laser light emitting element unit of said transmission side interface unit and optical fibers to transmit said optical signals from said transmission side interface unit to said reception side interface unit.

2. The optical DVI cable as recited in claim 1, wherein
said reception side interface unit has a power supply terminal electrically connected to said power converter unit for connection to an AC/DC power adapter; and
said one or more metal wires includes a single metal wire to supply power from said power conversion unit to said laser light emitting element unit from said reception side interface unit.

3. The optical DVI cable as recited in claim 1, wherein
said transmission side interface unit has a power supply terminal electrically connected to said power converter unit for connection to an AC/DC power adapter; and
said one or more metal wires includes an outbound-path metal wire and a return-path metal wire to supply power to said laser light emitting element unit via said reception side interface unit.

4. The optical DVI cable as recited in claim 1, wherein
said composite cable is removably connected to said transmission side interface unit via a connector.

5. An optical signal transmission equipment comprising:
the optical DVI cable as recited in claim 1; and
an AC/DC power adapter to supply power to said laser light emitting element unit via said power converter unit and said one or more metal wires.

6. An optical signal transmission system comprising:
the optical DVI cable as recited in claim 1;
an AC/DC power adapter to supply power to said laser light emitting element unit via said metal wires;
a host device connected to said transmission side interface unit; and
a display device connected to said reception side interface unit.

7. The optical signal transmission system as recited in claim 6, wherein
said transmission side interface unit has a power supply terminal electrically connected to said power converter unit for connection to an AC/DC power adapter;
said one or more metal wires comprise an outbound-path metal wire and a return-path metal wire to supply power to said laser light emitting element unit from said transmission side interface unit via said reception side interface unit; and
said display device includes a turn-back circuit to receive power from said outbound-path metal wire and conduct the power is turned back to said return-path metal wire.

8. The optical DVI cable as recited in claim 1, wherein
said composite cable is removably connected to said reception side interface unit via a connector.

9. A method of transmitting optical signals comprising:
providing an optical DVI cable with a transmission side interface unit, a reception side interface unit and a composite cable extending therebetween;
providing DC power to the reception side interface unit;
transmitting the DC power from the reception side interface unit to the transmission side interface unit via at least one metal wire within the composite cable;
transmitting electronic signals from a host device to the transmission side interface unit of the optical DVI cable;
converting the electronic signals received from the host device into optical signals within the transmission side interface unit of the optical DVI cable using the DC power supplied from the reception side interface unit; and transmitting the optical signals from the transmission side interface unit to the reception side interface unit via optical fibers within the composite cable.

10. The method of transmitting optical signal according to claim 9 further comprising:
converting optical signals received from the transmission side interface unit into electrical signals within the reception side interface unit using the DC power; and
transmitting the electrical signals from the reception side interface unit to a display device connected to the reception side interface unit of the optical DVI cable.

* * * * *